United States Patent
Beasley, Jr.

(10) Patent No.: US 10,308,208 B2
(45) Date of Patent: Jun. 4, 2019

(54) AIRBAG MADE FROM A FABRIC SUBSTRATE COATED ON AN EXTERIOR SIDE AND ON AN OPPOSITE INTERIOR SIDE

(71) Applicant: International Textile Group, Inc., Greensboro, NC (US)

(72) Inventor: Alonzo W. Beasley, Jr., Easley, SC (US)

(73) Assignee: International Textile Group, Inc., Greensboro, NC (US)

( * ) Notice: Subject to any disclaimer, the term of this patent is extended or adjusted under 35 U.S.C. 154(b) by 0 days.

(21) Appl. No.: 15/047,816

(22) Filed: Feb. 19, 2016

(65) Prior Publication Data

US 2016/0244019 A1  Aug. 25, 2016

Related U.S. Application Data

(60) Provisional application No. 62/118,881, filed on Feb. 20, 2015.

(51) Int. Cl.
*B60R 21/232* (2011.01)
*B60R 21/235* (2006.01)
(Continued)

(52) U.S. Cl.
CPC .......... *B60R 21/235* (2013.01); *B60R 21/232* (2013.01); *D06N 3/0006* (2013.01); (Continued)

(58) Field of Classification Search
CPC .... B60R 2012/003; B60R 2021/23514; B60R 2021/23523; B60R 21/232; B60R 21/235; D06N 3/0006; D06N 3/128; D06N 3/186; D10B 2331/02; D10B 2331/04; D10B 2505/124
USPC ............ 280/743.2, 730.2, 734, 728.1, 743.1; 442/59, 79, 157, 159, 168, 169, 170, 182, 442/183, 189, 239, 242, 248, 249, 250, 442/251, 255, 260, 261, 286, 293; 428/34.1, 423.5, 35.7, 35.9, 36.1, 36.2, 428/36.8, 36.9, 36.91, 53, 68, 69, 74, 98, 428/101, 102, 219, 220, 446, 447; 524/588, 47.5; 139/389, 384 R, 408
See application file for complete search history.

(56) References Cited

U.S. PATENT DOCUMENTS 3,220,972 A  11/1965  Lamoreaux
3,284,406 A  11/1966  Nelson
(Continued)

OTHER PUBLICATIONS

International Search Report and Written Opinion for PCT/US2016/018603 dated May 2, 2016, 9 Pages.
(Continued)

*Primary Examiner* — Arti Singh-Pandey
(74) *Attorney, Agent, or Firm* — Dority & Manning, P.A.

(57) ABSTRACT

A dual coated fabric that is well suited for producing vehicle airbags. The coated fabric includes a first coating on one side and a second coating on a second and opposite side. The first coating may comprise an elastomeric coating, such as a cured rubber. The second coating on the opposite side, however, may comprise a non-elastomeric coating. The non-elastomeric coating provides dimensional stability and provides an excellent counterbalance to the elastomeric coating.

21 Claims, 2 Drawing Sheets

(51) Int. Cl.
  *D06N 3/00* (2006.01)
  *D06N 3/18* (2006.01)
  *D06N 3/12* (2006.01)
  *B60R 21/00* (2006.01)

(52) U.S. Cl.
  CPC ............ *D06N 3/128* (2013.01); *D06N 3/186* (2013.01); *B60R 2021/003* (2013.01); *B60R 2021/23514* (2013.01); *B60R 2021/23523* (2013.01)

(56) References Cited

U.S. PATENT DOCUMENTS

| | | | |
|---|---|---|---|
| 3,434,366 | A | 3/1969 | Raso et al. |
| 3,697,473 | A | 10/1972 | Polmanteer et al. |
| 4,340,709 | A | 7/1982 | Jeram et al. |
| 5,486,210 | A | 1/1996 | Kerr et al. |
| 5,783,311 | A | 7/1998 | Lorenzetti et al. |
| 5,881,776 | A | 3/1999 | Beasley, Jr. |
| 6,328,334 | B1 | 12/2001 | Kanuma |
| 6,455,449 | B1 | 9/2002 | Veiga et al. |
| 6,630,220 | B1 | 10/2003 | Veiga |
| 6,632,753 | B1 | 10/2003 | Beasley, Jr. |
| 6,734,124 | B2 | 5/2004 | Hurst et al. |
| 7,501,359 | B2 | 3/2009 | Li |
| 2003/0190429 | A1* | 10/2003 | Blackwood .......... C09D 175/04 427/385.5 |
| 2005/0137321 | A1 | 6/2005 | Dumont et al. |
| 2006/0192373 | A1 | 8/2006 | Manley |
| 2007/0040368 | A1 | 2/2007 | Manley |
| 2008/0036183 | A1 | 2/2008 | Keshavaraj et al. |
| 2008/0085942 | A1 | 4/2008 | Jackson et al. |
| 2009/0114378 | A1 | 5/2009 | Lang et al. |
| 2009/0124149 | A1 | 5/2009 | Barnes et al. |

OTHER PUBLICATIONS

Lubrizol Technical Data Sheet, HYCAR 2679, Acrylic Emulsion, Jun. 4, 2007, 10 pages.

* cited by examiner

AIRBAG MADE FROM A FABRIC SUBSTRATE COATED ON AN EXTERIOR SIDE AND ON AN OPPOSITE INTERIOR SIDE

RELATED APPLICATIONS

The present application is based upon and claims priority to U.S. Provisional Patent application having Ser. No. 62/118,881, filed on Feb. 20, 2015, and herein incorporated by reference.

BACKGROUND

Within a passenger compartment of a vehicle, many occupant restraint systems can be utilized, such as seatbelts and airbag systems. For instance, airbag systems can supplement the protection offered by seatbelts. Airbag systems typically comprise at least one folded airbag and an inflation gas. The airbag system is designed to inflate the airbag with the inflation gas when a collision between the vehicle and another object is detected.

Traditional airbag systems include driver-side airbags, passenger-side airbags, and side-impact airbags. Driver-side airbags are normally located in the steering column of the vehicle and passenger-side airbags are typically located in the dash board. Side-impact airbags include side cushion airbags, typically mounted in the outboard side of the seat, and side-curtain airbags, which are usually stored in the roof line and connected along the door frame.

Driver-side and passenger-side airbags often include vent holes to expel the inflation gas relatively quickly after inflation. Side-impact airbags including side curtain airbags, in contrast, remain inflated over long periods of time in order to offer prolonged protection in events such as roll-over crashes.

Usually, airbags are made of a woven fabric due to the substantial force the airbag must sustain from the inflating gas during deployment. Many different materials, either coated or uncoated, have been utilized in the manufacture of airbags, for example as described in U.S. Pat. Nos. 5,881,776 and 6,632,753, both of which are incorporated by reference herein.

Airbags in the past have been made using various techniques and processes. For example, in some applications, airbags are made by sewing together various panels. In other applications, instead of being made from separate panels, the airbags are made in a single weaving operation using, for instance, a Jacquard loom. Jacquard looms, for example, are capable of weaving together an airbag including a first side separated from a second side joined by a woven seam in one single operation, in a two dimensional structure. Such airbags are known in the art as "one-piece woven" airbags. One-piece woven airbags, however, are very expensive to produce, due to high levels of off quality in the weaving, coating and/or laminating process. For example, side curtains can require extensive levels of coating to allow for transition in the seams from plain to basket weave in the "binder" seam. One piece woven cushions also have inherent high cost due to high capital costs, overhead, and design support needed. Also, design changes are costly with new patterns and arrangements.

Expensive films of nylon or polyester can be used to produce airbags but are slow in processing and unreliable in adhesion levels.

Multi-piece airbags in the past have typically been made from a coated fabric. For instance, multi-piece airbags have been made from fabrics coated with a silicone or a neoprene. Although such fabrics can meet the permeability requirements needed for an airbag fabric, further improvements are needed.

For example, multi-piece airbags made from coated fabrics have a tendency to become damaged when inflated by an inflating mechanism. Inflating mechanisms used today, for instance, can generate hot gases that subject the airbag to significant forces. These forces can cause elongating or combing of the airbag fabric. Combing results when the yarns begin to fray and gases can leak along the sewn seam lines.

The present disclosure is directed to further improvements in airbag fabrics and in airbags made from the fabrics.

SUMMARY

The present disclosure is generally directed to a fabric material for use in constructing airbags, primarily, but not limited to, safety curtains. The present disclosure is also directed to airbags made from the fabric material. In accordance with the present disclosure, the fabric material contains a fabric substrate that is coated on each side with different coating materials that combine together to produce a dual coated fabric having an optimum combination of properties for use in airbag applications.

For instance, in one embodiment, the present disclosure is directed to a vehicle airbag. The airbag comprises at least a first fabric panel attached to a second fabric panel. In one embodiment, the first fabric panel is sewn to the second fabric panel.

Each fabric panel is comprised of a woven fabric substrate having a first side and an opposite second side. The fabric substrate can be made from yarns, such as spun yarns or multifilament yarns. In one embodiment, the yarns are made from a polyester, a polyamide (nylon), or mixtures thereof. The yarns can generally have a denier of from about 210 to about 840, such as from about 420 to about 630. In one embodiment, the woven fabric substrate can have a yarn count in both the warp direction and the weft direction of from about 40 to about 55, such as from about 42 to about 48 depending on the yarn size.

In one embodiment, when using a 210 denier yarn, the woven fabric substrate can have a yarn count in both the warp direction and the weft direction of from about 65 to about 74. As for yarns having a denier of 315, the yarn count can range from about 55 to about 63 in both the warp direction and weft direction. In one embodiment made of a 420 denier yarn, on the other hand, the yarn count can be from about 46 to about 53 in the warp direction and in the weft direction. In one embodiment made of yarns 630 denier in size, the woven fabric substrate can have a yarn count in both the warp direction and the weft direction of from about 39 to about 43.

In accordance with the present disclosure, a first coating is present on the first side of the fabric substrate. The first coating comprises an elastomeric material, particularly a cured rubber. In one embodiment, the first coating may comprise a silicone rubber or neoprene. The amount of coating applied is related to the construction and yarn size of the material. Typically, fabric made with a larger yarn size will require a greater amount of coating. The first coating can be present on the first side of the fabric substrate in an amount from about 15 gsm to about 50 gsm, such as in an amount from about 20 gsm to about 35 gsm, such as in an amount from about 25 gsm to about 30 gsm, especially when using a silicone rubber. The coating weight depends on the elastomeric material being used. The first coating can be applied to the fabric substrate as a water-based coating, a solvent-based coating, a platinum-cured silicone, or a solvated rubber.

A second coating is present on the second side of the fabric substrate. The second coating comprises a non-elastomeric polymer. The second coating restricts the stretching properties of the fabric substrate and prevents or inhibits the fabric from combing and leaking when subjected to the forces of an inflation gas. The second coating provides dimensional stability to the fabric substrate. In one embodiment, the non-elastomeric polymer used to produce the second coating may comprise an acrylic polymer or urethane. The second coating can be water-based or can be a non-aqueous solvated system. The amount of required coating is again dependent on the original fabric weight and construction. In one embodiment, the second coating may be present on the second side of the fabric substrate in an amount but not limited to from about 8 gsm to about 15 gsm, such as in an amount from about 5 gsm to about 20 gsm, such as in an amount from about 10 gsm to about 15 gsm.

When the fabric panels are sewn together, the fabric panels can be configured such that the first coating on the first fabric panel contacts the first coating on the second fabric panel. In this manner, a rubber to rubber attachment is produced that not only increases the seam strength of the resulting airbag, but also reduces air permeability along the seam.

In one embodiment, the airbag made according to the present disclosure may comprise a side-curtain airbag that is non-vented. The airbag may be capable of not only inflating but maintaining an inflated state for a long period of time. For instance, when tested according to the Cosmo leak down test, the airbag can have a rating of greater than about 100, such as greater than about 105, such as greater than about 110.

As described above, coated fabrics made according to the present disclosure have excellent properties. For instance, the coated fabric made according to the present disclosure can have a warp and weft dimensional stability of less than about 1.5 when tested according to ISO Test 3759. The coated fabric can have a static air permeability of less than about 0.5 L/m² when tested according to ISO Test 9237. In addition, the coated fabric can have a warp comb strip of no less than 700 N when tested according to ASTM Test D6479.

In addition to vehicle airbags, the present disclosure is also directed to the dual coated fabric as described above.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
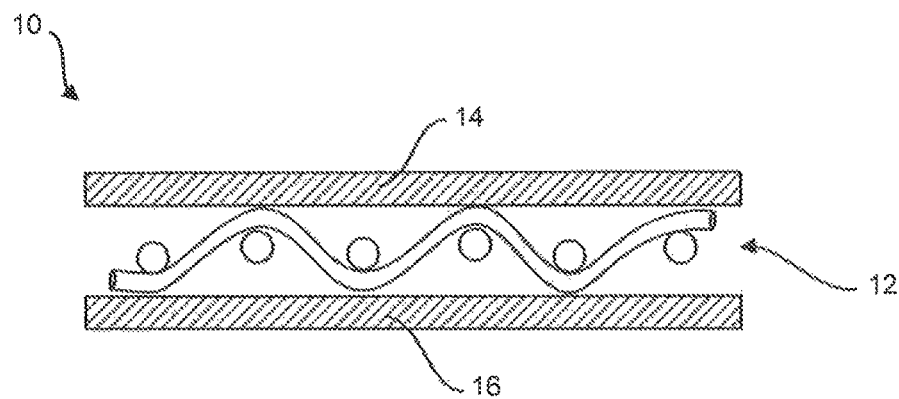
FIG. 1 is a side view of one embodiment of a dual coated fabric made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a dual coated fabric for use in constructing vehicle airbags. The dual coated fabric includes a fabric substrate that can be made from synthetic yarns, such as polyester yarns, polyamide yarns, or mixtures thereof. The fabric substrate can be a woven fabric containing warp yarns and weft (or fill) yarns. In accordance with the present disclosure, the fabric substrate is coated on one side with an elastomeric material and coated on an opposite side with a non-elastomeric material.

The elastomeric material, which may comprise a cured rubber, provides the fabric with excellent air retention properties for use in a vehicle airbag. The elastomeric coating can also help seal the product along the edges, depending upon the coating weight. The elastomeric material allows two pieces of the fabric to be sewn together and produce a strong seam that maintains desired air permeability and retention properties.

The non-elastomeric material coated on the opposite side of the fabric, on the other hand, provides the fabric with dimensional stability. In particular, the non-elastomeric material prevents the fabric from elongating and becoming damaged when subjected to the forces of the inflating gas during deployment of the airbag. The non-elastomeric material, for instance, prevents combing and seam leakage.

Referring to FIG. 1, one embodiment of a dual coated fabric 10 made in accordance with the present disclosure is shown. As illustrated, the coated fabric 10 includes a fabric substrate 12. The fabric substrate 12 can be made from yarns, such as spun yarns, multifilament yarns, or a combination of spun yarns and multifilament yarns. The fabric substrate 12 can have any suitable weave, such as a plain weave. Although woven fabrics may be preferred, in one embodiment, the fabric substrate 12 may comprise a knitted fabric or even a nonwoven as long as the substrate has sufficient strength.

In accordance with the present disclosure, a first coating 14 is present on a first side of the fabric substrate 12. The first coating 14 may comprise an elastomeric coating. In one embodiment, for instance, the first coating 14 may comprise a cured rubber material.

On the second and opposite side of the fabric substrate 12 is a second coating 16. The second coating 16 is placed on the fabric in order to give the fabric dimensional stability and to prevent the fabric from leaking or combing when subjected to forces, such as forces that are placed on the fabric by an airbag inflation mechanism.

Figure 2:
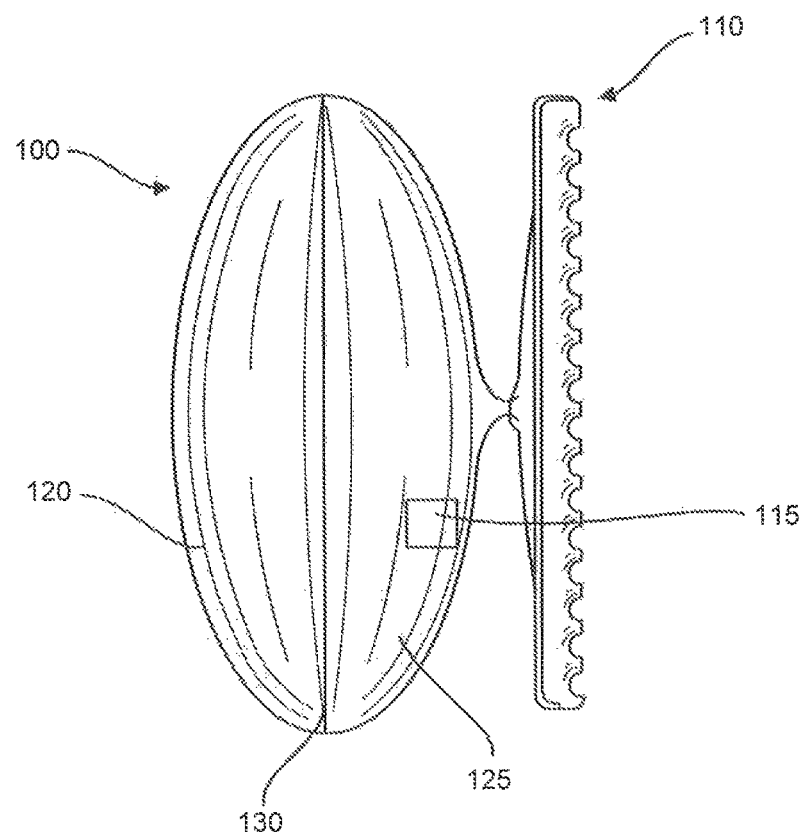
FIG. 2 is a side view of an inflated driver-side airbag made in accordance with the present disclosure.

Although the dual coated fabric of the present disclosure may be used in many different applications, the coated fabric is particularly designed for use in constructing vehicle airbags. Referring to FIG. 2, one exemplary embodiment of a driver-side airbag 100 is shown deployed from a steering wheel 110. The driver-side airbag 100 as shown in FIG. 2 may be constructed from the dual coated fabric of the present disclosure.

As shown, driver-side air bag 100 appears to be a circular air bag when viewed from the driver seat and an oval air bag when viewed from the side. However, the shape of the air bag can vary according to the particular application of the air bag. Air bag 100 is made of two panels, front panel 120 and back panel 125, which are held together at seam 130. In back panel 125, vent 115 can be seen allowing air to escape the air bag after deployment. Both front panel 120 and back panel 125 comprise the dual coated fabric of the present disclosure joined at seam 130 to create a substantially air impermeable bag.

In an alternative embodiment, the air bag 100, instead of being made from only a front panel and a back panel, may also include side panels. The air bag may be gusseted to include a sidewall positioned in between a front panel and a back panel.

Seam 130 as shown in the embodiment in FIG. 2 can be situated outward on the air bag or can be inverted to be facing the inside of the air bag. Seam 130 can join together front panel 120 and back panel 125 by any known method in the art, such as hot melting, stitching, sewing, gluing with an adhesive, sonic or radio frequency welding, thermal bonding, and the like.

In one embodiment of the present disclosure, the seam 130 is produced by placing the first coating or elastomeric coating of the front panel 120 in contact with the first coating or elastomeric coating of the second panel 125. The seam 130 can be produced through sewing without having to apply any additional adhesives or without having to subject the two fabric panels to any further processes. The present inventor discovered that producing the seam by placing the two elastomeric coatings in contact with each other provides various advantages and benefits, especially when using a cured rubber, such as a silicone rubber. The elastomeric coatings, for instance, provide decreased air permeability when sewn together. Air retention can be further enhanced when tapes are used during the sewing process on the outside of the bag. The tapes may comprise a polymer coated fabric. In addition, the seam can have increased strength.

When an air bag is used on the passenger-side of the vehicle, the inflation period can be slower because the passenger of a vehicle is typically not as close to the dashboard as the driver is to the steering wheel. Thus, there is a little more time allowed for the inflation of the air bag. However, the inflating gas can be just as hot because a typical passenger-side air bag has more volume, meaning more gas must be used to fill the bag.

Figure 3:
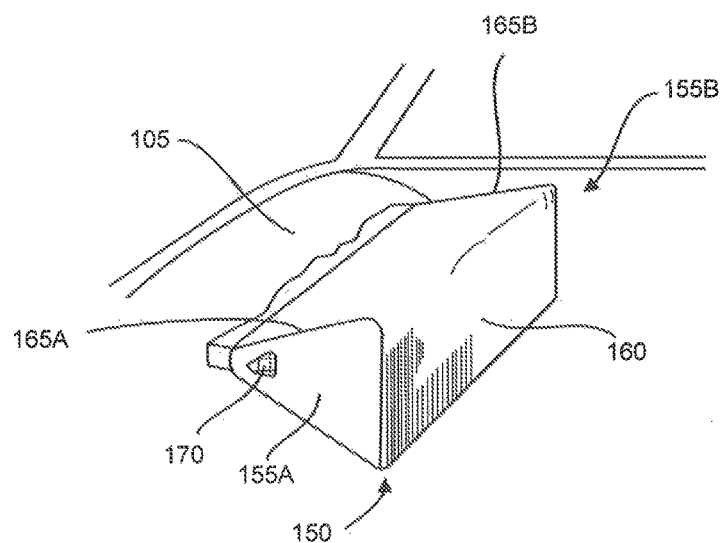
FIG. 3 is a perspective view of an inflated passenger-side airbag made in accordance with the present disclosure.

For instance, FIG. 3 depicts a passenger-side air bag 150 deployed from dashboard 105 within the passenger compartment of a car. As shown, passenger side air bag 150 is made of a front panel 160 and two side panels 155A and 155B, joined at seams 165A and B. As such, front panel 160 and side panels 155A and B can be produced from the dual coated fabric of the present disclosure. The seams 165A and B can be produced only through sewing by combining the panels such that the elastomeric coating of one panel faces the elastomeric coating of an opposite panel. Also, vent 170 is shown in side panel 155A to allow the inflation gas to escape shortly after deployment of the air bag.

Typically, both driver-side air bags and passenger-side air bags are designed to quickly deflate after it is inflated by the inflation gas in a process referred to as "leak down." Thus, vent holes can be utilized in driver-side air bags and passenger-side air bags to help control the deflation of the air bags as it is impacted by the vehicle occupant. As a result, adequate support can be provided to the vehicle occupant without excessive rebounding. Deflation of the air bag also facilitates the ability of a passenger to exit a vehicle once the air bag has deployed. The vents can be located anywhere on the air bag. One skilled in the art may weigh several factors in order to determine the placement, size, and shape of the vents, for instance, the size of the air bag, permeability of the air bag, material, the desired period of inflation, and other factors.

Of particular advantage, the coated fabric of the present disclosure may be constructed so as to be substantially air impermeable. Thus, vents may be used in order to precisely control the leak down rate of air bags made from the dual coated fabric. For example, various vents may be formed into the air bag, such as along the seam, so that the air bag deflates in a carefully controlled manner.

In both instances of driver-side and passenger-side airbag materials, the construction of the base materials may be reduced substantially with the dual coating technology. Such a reduction will provide better packaging of the air bag and potential weight reduction of the air bag.

In addition to driver-side and passenger-side air bags, many vehicles are now including other air bag systems to further protect occupants. For instance, many vehicles are now being equipped with side-cushion air bags and/or side-curtain air bags. A side-cushion air bag can typically be mounted in the outboard of a seat within the vehicle. Alternatively, a side-curtain air bag can be mounted along the roof rail of the vehicle and can be designed to deploy downward to protect the passengers from the side-wall of the vehicle and the side-windows of the vehicle.

A side-curtain air bag can also protect passengers from debris of the glass windows of the vehicle's sidewalls that may break or shatter during a collision. In some instances, a side-curtain air bag can extend substantially the length of an interior side of the passenger compartment, protecting passengers in the front seat and the back seat.

Figures 4A, 4B:
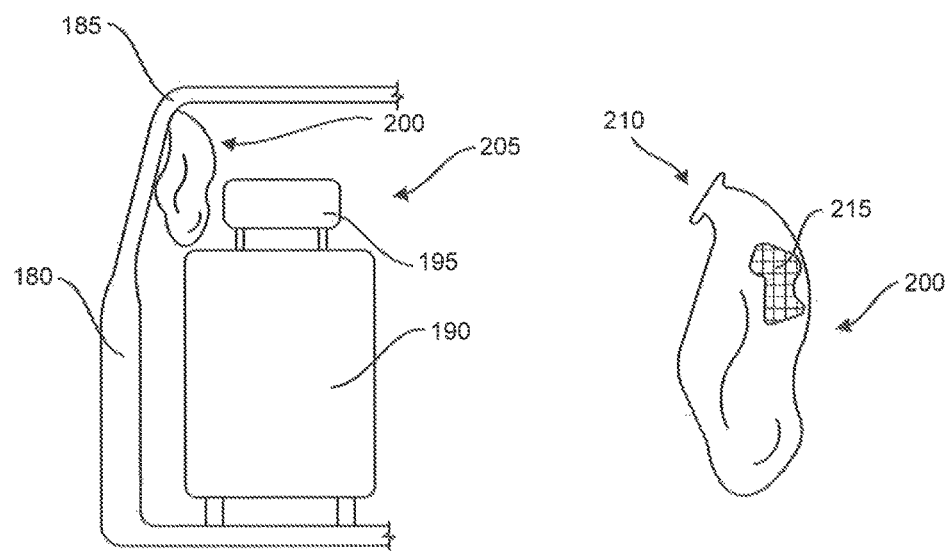
FIG. 4A is a rear view of an inflated side-curtain airbag made in accordance with the present disclosure.
FIG. 4B is a perspective view of an inflated side-curtain airbag made in accordance with the present disclosure.

FIGS. 4A and 4B depict a side-curtain air bag 200 made in accordance with the present disclosure that has been deployed. Referring to FIG. 4A, side-curtain air bag 200 is shown deployed within passenger compartment 205 of vehicle 180. Vehicle 180 is shown to have seat 190 with headrest 195 designed to allow seating of an occupant within passenger compartment 205 of vehicle 180. As shown, air bag 200 is deployed in a manner that would protect an occupant of the vehicle from head injury caused by impact of the occupant's head and the side of vehicle 180. Side-curtain air bag 200 is shown deployed from the upper corner rail 185 of vehicle 180. In FIG. 4B, side-curtain air bag 200 is shown without the vehicle 180 present. As such, side-curtain air bag 200 is shown with opening 210 to allow inflation of gas to enter the air bag during deployment. As shown in the figures, air bag 200 is constructed from a dual coated fabric made according to the present invention.

In contrast to driver-side and passenger-side air bags, some side-cushion and side-curtain air bags should remain pressurized for relatively long periods, from about 10 to about 15 seconds, for continuous protection of the vehicle occupant from additional side impacts or rollover of the vehicle. As such, side-curtain air bag 200 is shown not to include vent holes in the air bag. However, it may be desired to include vents in side cushion or side-curtain air bags in some applications.

Air permeability is measured by several different tests known in the art. In one embodiment, air permeability is measured using Textest Model FX3300 air permeability tester manufactured and sold by Textest Ag. Tests are conducted at 500 Pa using a 100 mm diameter orifice. Coated fabrics made according to the present invention may have an air permeability according to the above test of from 0 to about 2 L/dm², such as less than about 2 L/dm², such as less than about 1 L/dm², such as less than 0.75 L/dm².

The Airbag Material Air Flow Test, on the other hand, is a relatively high pressure (at 121 kPa) static air test and has results measured in liters per minute. The Airbag Material Air Flow Test is conducted, for instance, using a Airbag Material Air Flow Tester which is commercially available by Cosmo Instruments Co., LTD. Coated fabrics made according to the present invention may have an air permeability according to the Airbag Material Air Flow Test of from 0 to about 0.8 liters per minute when the machine settings are at 121 kPa and within the Operation Range Mode 2. In one embodiment, the air permeability of the coated fabric may be less than about 0.2, such as less than about 0.19.

In one embodiment, air permeability can be measured according to ISO Test 9237. According to ISO Test 9237, static air permeability is measured in L/m². Coated fabrics made according to the present disclosure can have a static air permeability of less than about 1 L/m², such as less than 0.5 L/m².

Another test that is sometimes conducted on air bag fabrics is referred to as a "leak down" test. During a leak down test, an air bag fabric is pressurized and then the air pressure is monitored over time to record the decrease in air pressure. Thus, the leak down test measures the amount of air pressure reduction that occurs after the air bag fabric has been pressurized. In order to conduct the test, the machine is set at an airflow rate of 9 liters per minute. The fabric is placed in the machine and pressurized to 121 kPa. Airflow is then stopped once the fabric is pressurized to 121 kPa and a final pressure is recorded after 10 seconds. This test determines how well the fabric maintains pressure.

The leak down of fabrics can be measured with the Airbag Material Air Flow Tester available by Cosmo Instruments Co., Ltd. Airbags made according to the present disclosure can have a Cosmo leak down test result after 10 seconds of greater than about 100 kPa, such as greater than about 105 kPa, such as greater than 110 kPa. The Cosmo leak down is typically less than about 120 kPa.

As described above, the dual coated fabric of the present disclosure includes a fabric substrate having a first elastomeric coating on one side and a second non-elastomeric coating on an opposite side. Air bags should be constructed so as to be capable of withstanding the force of the inflation gas and also impact with a driver or passenger. The air bag, with the exception of roll-over applications, should also be configured to deflate or "leak down" after impact with a driver or passenger. In this regard, low air permeability in air bags can be important to provide for controlled gas inflation and deflation.

The yarns used to form the air bag fabric of the present disclosure can vary depending upon the particular application. In general, the warp yarns and weft yarns may be made from natural or synthetic materials. In one embodiment, for instance, the warp yarns and weft yarns may comprise multifilament yarns made from a synthetic polymer. The polymer used to form the yarns may comprise, for instance, a polyamide polymer, a polyimide polymer, an acrylic polymer, a fluoropolymer, a polyester polymer, or a polyolefin polymer. The polyolefin polymer may comprise a polyethylene, a polypropylene, copolymers thereof and blends thereof. Particular polyesters that may be used include polyethylene terephthlate, polybutylene terephthlate, polycyclohexylene terephthlate, polycyclohexylene dimethylene terephthlate, glycol modified polyethylene terephthlate, combinations thereof, and copolymers thereof.

In one particular embodiment, the multifilament yarns are formed from a polyamide, such as polyamide 66 or polyamide 6.

In general, the yarns can have a denier of from about 210 to about 840. For instance, the yarns can have a denier of 210, 315, 420, 630, or 840.

The yarn density or count in the warp direction and the weft direction can vary depending upon the denier of the yarns and the desired permeability of the fabric. For instance, when using yarns having a denier of from about 210 to about 840, the yarn density in both the warp direction and the weft direction can be from about 15 yarns per inch to about 75 yarns per inch. In particular, when using a 210 denier yarn, the yarn density can be from about 60 yarns per inch to about 75 yarns per inch. When using 350 denier yarns, on the other hand, the yarn density can be from about 50 yarns per inch to about 65 yarns per inch. When using yarns having a denier of about 420, the yarn density can be from about 40 yarns per inch to about 55 yarns per inch. When using 630 denier yarns, the yarn density can be from about 35 yarns per inch to about 45 yarns per inch, and when using 840 denier yarn, the yarn density can be from about 20 yarns per inch to about 34 yarns per inch. It should be understood, however, that the above ranges are merely exemplary for some applications.

Each multifilament yarn can contain from about 80 filaments to about 250 filaments. For instance, each yarn can contain greater than about 85 filaments, such as greater than about 90 filaments, such as greater than about 100 filaments, such as greater than about 110 filaments, such as greater than about 120 filaments, such as greater than about 130 filaments. Each yarn generally contains less than about 250 filaments, such as less than about 220 filaments, such as less than about 200 filaments, such as less than about 180 filaments, such as less than about 160 filaments, such as less than about 150 filaments, such as less than about 145 filaments.

Once the fabric substrate is constructed, the first side of the fabric is treated with a first coating that comprises an elastomeric material. In one embodiment, the elastomeric material may comprise a rubber material that has been cured. The elastomeric coating reduces the permeability of the fabric and provides the fabric with sufficient bending force so that the fabric can be folded and stored until the airbag is deployed.

In general, the elastomeric coating is formed from an elastomeric polymer optionally in combination with a curing agent. In one particular embodiment, the first coating comprises a silicone rubber or a neoprene rubber.

In general, any suitable elastomeric composition may be used to produce the first coating. When applying a silicone rubber to the first side of the fabric substrate, the silicone rubber composition can vary. In one embodiment, for instance, the elastomeric composition may contain a polydiorganosiloxane in combination with a catalyst and optionally an adhesion promoter.

In one embodiment, the silicone composition comprises a polydiorganosiloxane containing at least two alkenyl groups per molecule; a polyorganohydrogenosiloxane containing at least two hydrogen atoms linked to silicon in each molecule; a metallic catalyst of the platinum group; an adhesion promoter consisting of an epoxy-functional organosilicon compound; a mineral filler; a resin polyorganosiloxane; and optionally a compound that is useful as a curing inhibitor.

In another embodiment, the silicone composition comprises a polydiorganosiloxane containing at least two alkenyl groups per molecule; a polyorganohydrogenosiloxane containing at least two hydrogen atoms linked to silicone in each molecule; a silane containing a methacrylic function; an epoxyalkoxysilane; an aluminium chelate; and a metallic catalyst of the platinum group.

In still another embodiment, the elastomeric coating composition comprises at least one polyorganosiloxane containing, per molecule, at least two C2-C6 alkenyl groups linked to silicon; at least one polyorganosiloxane containing, per molecule, at least two hydrogen atoms linked to silicon; a catalytically effective amount of at least one catalyst, composed of at least one metal belonging to the platinum group; an adhesion promoter; optionally, a mineral filler; optionally, at least one curing inhibitor; and optionally, at least one polyorganosiloxane resin, in which composition the adhesion promoter may comprise a ternary combination of the following ingredients: at least one alkoxylated organosiloxane containing, per molecule, at least one C2-C6 alkenyl group; at least one organosilicon compound comprising at least one epoxy radical; and at least one metal chelate M and/or a metal alkoxide of general formula: M(OJ)n, with n=valency of M and J=linear or branched C1-C8 alkyl, M being chosen from the group formed by: Ti, Zr, Ge, Li, Mn, Fe, Al and Mg.

In one particular embodiment, the elastomeric composition comprises a polyorganosiloxane that may be cured. The composition, for instance, may comprise at least one polyorganosiloxane (I) containing, per molecule, at least two C2-C6 alkenyl groups linked to silicon; at least one polyorganosiloxane (II) containing, per molecule, at least two hydrogen atoms linked to silicon; a catalytically effective amount of at least one catalyst (III), composed of at least one metal belonging to the platinum group; at least one adhesion promoter (IV); an additive system (B) for improving the combing strength and the tear strength, the constituents of which are added sequentially or simultaneously, comprising a mixture formed from: (1) at least one polyorganosiloxane resin (V) present at up to 60% by weight relative to the total weight of the mixture and optionally mixed with at least one polyorganosiloxane serving as diluent, and (2) calcium carbonate ($CaCO_3$) present at up to 30% by weight relative to the total weight of the mixture; optionally, at least one curing inhibitor (VI); optionally, at least one coloration additive (VII); and optionally, at least one additive (VIII) for improving the fire resistance.

In one embodiment, one or more polyorganosiloxane resins may be present in the coating composition in an amount from about 5% to about 60% by weight, such as in an amount from about 10% to about 30% by weight.

The polyorganosiloxane used to produce the coating composition may comprise: (i) siloxyl units of formula:

$$R^1_a Z_b \mathrm{SiO}\frac{4-(a+b)}{2}$$

in which:
the symbols $R^1$ represent an alkenyl group, preferably vinyl or allyl,
the symbols Z, which may be identical or different, each represent a monovalent hydrocarbon-based group, free of unfavourable action on the activity of the catalyst and chosen from alkyl groups containing from 1 to 8 carbon atoms inclusive, optionally substituted with at least one halogen atom, and also from aryl groups,
a is 1 or 2, b is 0, 1 or 2 and the sum a+b is equal to 1, 2 or 3, and optionally (ii) other siloxyl units of formula:

$$Z_c \mathrm{SiO}\frac{4-c}{2}$$

in which:
Z has the same meaning as above and c is 0, 1, 2 or 3.

This polydiorganosiloxane (I) may have a viscosity at least equal to 200 mPa·s and preferably less than 200,000 mPa·s.

All the viscosities concerned in the present specification correspond to a dynamic viscosity magnitude that is measured, in a manner that is known per se, at 25° C.

The polyorganosiloxane (I) may be formed solely from units of formula (I-1) or may contain, in addition, units of formula (I-2). Similarly, it may have a linear, branched, cyclic or network structure. Z is generally chosen from methyl, ethyl and phenyl radicals, 60 mol % (or in numerical terms) at least of the radicals Z being methyl radicals. Examples of siloxyl units of formula (I-1) are vinyldimethylsiloxyl, vinylphenylmethylsiloxyl, vinylmethylsiloxyl and vinylsiloxyl units.

Examples of siloxyl units of formula (1-2) are the units $\mathrm{SiO}_{4/2}$, dimethylsiloxyl, methylphenylsiloxyl, diphenylsiloxyl, methylsiloxyl and phenylsiloxyl. Examples of polyorganosiloxanes (I) are linear and cyclic compounds, for instance: dimethyl-polysiloxanes containing dimethylvinylsilyl end groups, (methylvinyl)(dimethyl)-polysil-oxane copolymers containing trimethylsilyl end groups, (methylvinyl)(dimethyl)-polysiloxane copolymers containing dimethylvinylsilyl end groups and cyclic methylvinylpolysiloxanes.

Advantageously, the polyorganosiloxane (II) comprises siloxyl units of formula:

$$H_d L_e \mathrm{SiO}\frac{4-(d+e)}{2}$$

in which:
the groups L, which may be identical or different, each represent a monovalent hydrocarbon-based group, free of unfavourable action on the activity of the catalyst and chosen, preferably, from an alkyl group containing from 1 to 8 carbon atoms inclusive, optionally substituted with at least one halogen atom, advantageously from methyl, ethyl, propyl and 3,3,3-trifluoropropyl groups, an aryl group, and advantageously a xylyl, tolyl or phenyl radical,
d is 1 or 2, e is 0, 1 or 2, the sum d+e is equal to 1, 2 or 3, and
optionally, at least some of the other units being units of mean formula:

$$L_g \mathrm{SiO}\frac{4-g}{2}$$

in which the groups L have the same meaning as above and g is equal to 0, 1, 2 or 3.

The dynamic viscosity of this polyorganosiloxane (II) is at least equal to 10 mPa·s and preferably between 20 and 1000 mPa·s. The polyorganosiloxane (II) may be formed solely from units of formula (II-1) or may also comprise units of formula (II-2). The polyorganosiloxane (II) may have a linear, branched, cyclic or network structure. The group L has the same meaning as the group Z above.

Examples of units of formula (II-1) are $H(CH_3)_2SiO_{1/2}$, $HCH_3SiO_{2/2}$ and $H(C_6H_5)SiO_{2/2}$.

The examples of units of formula (II-2) are the same as those given above for the units of formula (I-2).

Examples of polyorganosiloxanes (II) are linear and cyclic compounds, for instance: dimethylpolysiloxanes containing hydrogenodimethylsilyl end groups; copolymers containing (dimethyl)(hydrogenomethyl)polysiloxane units containing trimethylsilyl end groups; copolymers containing (dimethyl)(hydrogenomethyl)polysiloxane units containing hydrogenodimethylsilyl end groups; hydrogenomethylpolysiloxanes containing trimethylsilyl end groups; cyclic hydrogenomethylpolysiloxanes.

The compound (II) may optionally be a mixture of a dimethylpolysiloxane containing hydrogenodimethylsilyl end groups and of a polyorganosiloxane bearing at least three functions SiH (hydrogenosiloxyle).

The ratio of the number of hydrogen atoms linked to silicon in the polyorgano-siloxane (II) to the total number of groups containing alkenyl unsaturation of the polyorganosiloxane (I) and of the resin (V) is between 0.4 and 10 and preferably between 0.6 and 5.

The bases of silicone polyaddition compositions may comprise only linear polyorganosiloxanes (I) and (II), for instance those described in patents: U.S. Pat. No. 3,220,972, U.S. Pat. No. 3,697,473 and U.S. Pat. No. 4,340,709 or may comprise both branched or network polyorganosiloxanes (I) and (II), for instance those described in patents: U.S. Pat. No. 3,284,406 and U.S. Pat. No. 3,434,366.

According to one particular embodiment, the following are used: at least one linear polyorganosiloxane (I) comprising chains formed from units of formula (I-2) in which c=2, blocked at each of their ends with units of formula (I-1) in which a=1 and b=2, and at least one linear polyorganosiloxane (II) comprising in its structure at least three hydrogen atoms linked to silicon, located in the chains and/or at chain ends; and even more particularly: at least one linear polyorganosiloxane (I) comprising chains formed from units of formula (I-2) in which c=2, blocked at each of their ends with units of formula (I-1) in which a=1 and b=2, and at least one linear polyorganosiloxane (I) comprising chains formed from units of formula (II-1) in which d=1 and e=1 optionally units of formula (II-2) in which g=2, blocked at each of their ends with units of formula (II-1) in which d=1 and e=2.

In one embodiment, a silicone rubber composition is used that has a viscosity of greater than about 5000 mPa·s, such as greater than about 8000 mPa·s, such as greater than about 10,000 mPa·s, such as greater than about 12,000 mPa·s. The composition can generally have a viscosity of less than about 70,000 mPa·s, such as less than about 60,000 mPa·s, such as less than about 50,000 mPa·s, such as less than about 40,000 mPa·s, such as less than about 30,000 mPa·s, such as less than about 25,000 mPa·s, such as less than about 20,000 mPa·s. The silicon rubber can have a shore A hardness of greater than about 25, such as greater than about 30, such as greater than about 35, such as greater than about 40, such as greater than about 45. The shore A hardness is generally less than about 80, such as less than about 70, such as less than about 60.

In addition to silicone rubber, various other cured rubber coatings may be applied to the fabric substrate. For instance, the elastomeric coating may comprise a neoprene or a chloroprene coating.

The elastomeric coating composition can be applied to the first side of the fabric substrate using any suitable method or technique and cured. In one embodiment, the coating composition is applied to the fabric substrate using a knife over roll method. In an alternative embodiment, a knife over air method may be used. In still another embodiment, the coating composition can be applied to a transfer roll which then transfers the coating composition to a surface of the fabric substrate.

The amount of the elastomeric coating applied to the fabric can depend upon numerous factors. In one embodiment, the dried coating weight can be from about 15 gsm to about 50 gsm, such as from about 20 gsm to about 35 gsm, such as from about 25 gsm to about 30 gsm.

In accordance with the present disclosure, the fabric substrate is also treated with a non-elastomeric coating. The non-elastomeric coating minimizes the stretch of the yarns and provides dimensional stability to the fabric. The non-elastomeric coating eliminates leaks and prevents the fabric from combing.

In general, the non-elastomeric coating can be made from any suitable thermoplastic polymer. For instance, the thermoplastic polymer may comprise a urethane polymer, such as a polyurethane polymer. In another embodiment, the thermoplastic polymer may comprise an acrylic compound. The non-elastomeric coating when applied to the fabric may comprise a water-based coating material or a solvent-based coating material.

In one embodiment, the non-elastomeric coating comprises an acrylic polymer. The acrylic polymer may be a water-based acrylic latex. In one embodiment, preferred acrylics include those with low glass transition temperatures and good aging stability. Coatings formed using acrylics with lower glass transition temperatures exhibit greater flexibility at low temperatures, which enhances the ability to pack the coated airbag into its module. The glass transition temperature of an acrylic polymer is determined by contributions of its corresponding monomers, when more than one monomer is used to make the polymer. The glass transition temperature of the homopolymer of at least one acrylate monomer is preferably less than about 0° C. and, more preferably, less than about −10° C. The glass transition temperature of the acrylate component is preferably in the range of from about −60° C. to about 10° C.; more preferably less than 0° C., and most preferably, −10° C. or less.

Preferred acrylic components include polyacrylates having monomers of ethyl acrylate, methyl methacrylate, butyl acrylate, styrene, acrylonitrile, ethylhexyl acrylate, lauryl acrylate, methacrylopropyl trimethoxysilane, methylol acrylamide, and combinations thereof. Examples of suitable acrylic latex compositions include Hycar 2679 and Lubrizol 4184 from The Lubrizol Corporation. Hycar 2679 contains approximately 49.0% by weight resin solids and has a glass transition temperature of −3° C. The resin solids of this latex are constituted by a copolymer of ethyl acrylate and acrylonitrile in which the repeating units derived from the ethyl acrylate constitute approximately 85% by weight and the repeating units derived from acrylonitrile constitute approximately 12% by weight of the resin.

In some embodiments, the acrylic polymer may comprise acrylic and diacrylic monomers having functional groups such as carboxyl, hydroxyl, or $NH_2$ functional groups. These monomers include, for example, hydroxy ethyl or propyl methacrylate, a dimethyl or diethyl amino ethyl acrylate or methacrylate, methyl, ethyl, and butyl acrylates and methacrylate, glycidyl methacrylate or mixtures thereof. Diacrylates may be especially preferred. Higher acrylate functionality such as triacrylates may result in crosslinking, which may be desired in some applications. For example, in one particular embodiment, the water-based acrylic comprises a mixture of methyl methacrylate, butyl acrylate, and acrylic acid.

The non-elastomeric coating can be applied to the fabric substrate after the elastomeric coating has been applied or can be applied simultaneously with the elastomeric coating. The non-elastomeric coating can be applied to the fabric substrate using the same techniques as described above with respect to the elastomeric coating.

The amount of the non-elastomeric coating applied to the fabric substrate can vary depending upon the particular application. In one embodiment, for instance, the non-elastomeric coating may have a dried coating weight of from about 2 gsm to about 30 gsm, such as from about 5 gsm to about 20 gsm, such as from about 10 gsm to about 15 gsm.

The dual coated fabric of the present disclosure possesses a combination of properties that makes the coated fabric well suited for use in airbag applications. The coated fabric can have a static air permeability of less than about 0.5 L/m² when tested according to ISO Test 9237. In addition to excellent air retention properties, for instance, the coated fabric has excellent physical properties and dimensional stability. For instance, the coated fabric can have a warp and weft dimensional stability of less than about 1.5, such as less than about 1.0 when tested according to ISO Test 3759. The coated fabric can also have a warp and weft comb strip of less than 1,000 N, such as less than about 950 N, such as less than about 900 N, when tested according to ASTM Test D6479. When tested according to the Cosmo leak down test, the dual coated fabric can also have a rating of greater than about 100, such as greater than about 105, such as greater than about 110.

The present disclosure may be better understood with reference to the following examples.

EXAMPLE

Various fabrics were made in accordance with the present disclosure. Each fabric was comprised of a woven fabric substrate coated on one side with a silicone rubber and on an opposite side with an acrylic non-elastomeric coating.

The fabric substrates of samples 1, 2, and 3 were constructed from a 420 denier yarn, the fabric substrate of sample 4 was constructed from a 315 denier yarn, and the fabric substrate of sample 5 was constructed from a 210 denier yarn. The fabric substrates of Samples 1, 2 and 3 had a yarn count of 50±2 in the warp direction and a yarn count of 50±2 in the weft or fill direction.

On one side, the coated fabric substrate was coated with a silicone rubber. The silicone rubber was obtained from Blue Star under the trade name BS 7515. The silicone rubber, which was platinum cured, was applied in an amount of 25 to 30±5 gsm.

The opposite side of the fabric substrate was coated with a non-elastomeric coating. The coating composition was obtained from Lubrizol under the trade name 4184. The non-elastomeric coating was applied to the fabric in an amount of 10 to 15 gsm (12±4 gsm).

The coated fabrics were tested for various properties and the following results were obtained:

| Test Attribute, Units | Test Method | Coated Sample No 1 | Sample No 2 | Sample No 3 |
|---|---|---|---|---|
| Yarn DTEX | | 470 | 470 | 470 |
| Construction, T/dm | ISO 7211 | 198 × 196 | 213 × 204 | 200 × 202 |
| Gauge/MM | ISO 5084 | 0.31 | 0.33 | 0.32 |
| Add-on weight/G/m2 | ISO 3374 | 35 | 0.33 | 41 |
| Total Weight/G/M2 | ISO 3374 | 233 | 254 | 253 |
| Warp Tensile Strength/N | ISO 5081 | 3420 | 3676 | 3263 |
| Warp Elongation/% | ISO 5081 | 32 | 36.2 | 34 |
| Weft Tensile Strength/N | ISO 5081 | 3478 | 3614 | 3384 |
| Weft Elongation/% | ISO 5081 | 29 | 28.3 | 30 |
| Warp Leg Tear Strength/N | ISO 13937 | 174 | 189 | 216 |
| Weft Leg Tear Strenth/N | ISO 13937 | 210 | 209 | 251 |
| Warp Dimensional Stability, % | ISO 3759 | 1 | 0.5 | 0.5 |
| Weft Dimensional Stability, % | ISO 3759 | 0 | 0 | 0 |
| Static Air Perm, L/DM2 | ISO 9237 | 0.2 | 0.4 | 0.3 |
| Warp Stiffness/N | ASTM D 4032 | 16 | 21 | 12 |
| Weft Stiffness/N | ASTM D 4032 | 16.0 | 21.0 | 14.5 |
| Warp Comb Strip/N | ASTM D 6479 | 111 | 1077.0 | 850.0 |
| Weft Comb Strip/N | ASTM D 6479 | 724 | 875.0 | 778.0 |
| Warp Flex Abrasion/Strokes | ISO 5981 | Pass/500 | 500/pass | Pass |
| Weft Flex Abrasion/Strokes | ISO 5981 | Pass/500 | 500/pass | Pass |
| Width, MM | | | | 190 |
| Flammability Warp | FMVSS302 | 1 | 1 | 1 |
| Flammability Weft | FMVSS302 | 1 | 1 | 1 |
| Cosmo test final pressure after 10 sec. (kPa) | | 113 | 111.1 | 117.6 |
| Blocking (PPAP only) | ISO 5978 | | | |

| Test Attribute, Units | Test Method | Sample No 4 | Sample No 5 |
|---|---|---|---|
| Yarn DTEX | | 350 | 235 |
| Construction, T/dm | ISO 7211 | 238 × 236 | 273 × 279 |
| Gauge/MM | ISO 5084 | 0.3 | 0.25 |
| Add-on weight/G/m2 | ISO 3374 | 42 | 42 |
| Total Weight/G/M2 | ISO 3374 | 221 | 184 |
| Warp Tensile Strength/N | ISO 5081 | 2893 | 2420 |
| Warp Elongation/% | ISO 5081 | 34.3 | 24.2 |
| Weft Tensile Strength/N | ISO 5081 | 3000 | 2166 |
| Weft Elongation/% | ISO 5081 | 29.7 | 34 |
| Warp Leg Tear Strength/N | ISO 13937 | 182.7 | 201 |
| Weft Leg Tear Strenth/N | ISO 13937 | 220.2 | 183 |
| Warp Dimensional Stability, % | ISO 3759 | | |
| Weft Dimensional Stability, % | ISO 3759 | | |
| Static Air Perm, L/DM2 | ISO 9237 | | |
| Warp Stiffness/N | ASTM D 4032 | 14.6 | 11 |
| Weft Stiffness/N | ASTM D 4032 | 12.7 | 12.3 |
| Warp Comb Strip/N | ASTM D 6479 | 1181 | 668 |
| Weft Comb Strip/N | ASTM D 6479 | 865 | 853 |
| Warp Flex Abrasion/Strokes | ISO 5981 | 500 pass | 500 pass |
| Weft Flex Abrasion/Strokes | ISO 5981 | 500 pass | 500 pass |
| Width, mm | | 1.81 | 1.7 |

-continued

| | Coated | | |
|---|---|---|---|
| Flammability Warp | FMVSS302 | | |
| Flammability Weft | FMVSS302 | | |
| Cosmo test final pressure after 10 sec. (kPa) | | 118.5 | 121 |
| Blocking (PPAP only) | ISO 5978 | | |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A vehicle airbag, comprising:
a first fabric panel attached to a second fabric panel, the first fabric panel and the second fabric panel being attached together to form an airbag having an exterior surface and an interior surface, the interior surface being configured to receive an inflation gas for inflating the airbag, the first fabric panel and the second fabric panel comprising:
(a) a woven fabric substrate having a first interior side and an opposite second exterior side, the first side of the woven fabric substrate comprising the interior surface of the airbag and the second side of the woven fabric substrate comprising the exterior surface of the airbag;
(b) a first coating directly applied to the first interior side of the fabric substrate, the first coating comprising an elastomeric material, the elastomeric material comprising a polyorganosiloxane containing, per molecule, at least two C2-C6 alkenyl groups linked to silicon, the first coating being a one-layer coating and forming the interior surface of the airbag;
(c) a second coating directly applied to the second exterior side of the fabric substrate, the second coating comprising a non-elastomeric thermoplastic polymer, the second coating being a one-layer coating and forming the exterior surface of the airbag; and
(d) the first fabric panel and second fabric panel being attached together such that the first interior side of the first panel and the first interior side of the second panel are in contact along the seam of the airbag such that the first coating comprising the elastomeric material on the first fabric panel contacts the first coating comprising the elastomeric material on the second fabric panel.

2. A vehicle airbag as defined in claim 1, wherein the elastomeric material comprises a cured rubber.

3. A vehicle airbag as defined in claim 1, wherein the elastomeric material was cured using a metal catalyst.

4. A vehicle airbag as defined in claim 1, wherein the second coating restricts the stretch properties of the fabric substrate.

5. A vehicle airbag as defined in claim 1, wherein the non-elastomeric polymer comprises an acrylic polymer or urethane.

6. A vehicle airbag as defined in claim 1, wherein the first coating is present on the first interior side of the fabric substrate in an amount from about 15 gsm to about 50 gsm.

7. A vehicle airbag as defined in claim 1, wherein the second coating is present on the second exterior side of the fabric substrate in an amount from about 8 gsm to about 15 gsm.

8. A vehicle airbag as defined in claim 1, wherein the woven substrate contains yarns comprising a polyester, a polyimide, or mixtures thereof.

9. A vehicle airbag as defined in claim 8, wherein the yarns have a denier of from about 210 to about 630.

10. A vehicle airbag as defined in claim 1, wherein the woven fabric substrate has a yarn count in a warp direction and in a fill direction of from about 40 to about 55.

11. A vehicle airbag as defined in claim 1, wherein the airbag is not vented.

12. A vehicle airbag as defined in claim 1, wherein the airbag comprises a side-curtain airbag.

13. A vehicle airbag as defined in claim 1, wherein the airbag has a Cosmo leak down of greater than 100 kPa.

14. A vehicle airbag as defined in claim 1, wherein the first fabric panel and the second fabric panel have a warp dimensional stability and a weft dimensional stability of less than about 1.0% when tested according to ISO Test 3759.

15. A vehicle airbag as defined in claim 1, wherein the first fabric panel and the second fabric panel have a static air permeability of less than about 0.5 $L/m^2$, when tested according to ISO Test 9237.

16. A vehicle airbag as defined in claim 1, wherein the first fabric panel and the second fabric panel have a warp comb strip of greater than about 700 N when tested according to ASTM Test D6479.

17. A vehicle airbag as defined in claim 1, wherein the yarns have a denier of 210 and the woven fabric substrate has a yarn count in a warp direction and in a fill direction of from about 60 yarns per inch to about 75 yarns per inch.

18. A vehicle airbag as defined in claim 1, wherein the yarns have a denier of 350 and the woven fabric substrate has a yarn count in a warp direction and in a fill direction of from about 50 yarns per inch to about 65 yarns per inch.

19. A vehicle airbag as defined in claim 1, wherein the yarns have a denier of 420 and the woven fabric substrate has a yarn count in a warp direction and in a fill direction of from about 40 yarns per inch to about 55 yarns per inch.

20. A vehicle airbag as defined in claim 1, wherein the yarns have a denier of 630 and the woven fabric substrate has a yarn count in a warp direction and in a fill direction of from about 35 yarns per inch to about 45 yarns per inch.

21. A vehicle airbag as defined in claim 1, wherein the first fabric panel is sewn to the second fabric panel to form a seam where the first fabric panel and the second fabric panel are attached together.

* * * * *